United States Patent [19]
Chung

[11] Patent Number: 5,774,710
[45] Date of Patent: Jun. 30, 1998

[54] CACHE LINE BRANCH PREDICTION SCHEME THAT SHARES AMONG SETS OF A SET ASSOCIATIVE CACHE

[75] Inventor: Shine Chung, San Jose, Calif.

[73] Assignee: Advanced Micro Devices, Inc., Sunnyvale, Calif.

[21] Appl. No.: 710,560

[22] Filed: Sep. 19, 1996

[51] Int. Cl.$^6$ ........................................ G06F 9/38

[52] U.S. Cl. .................... 395/585; 395/587; 395/800.23; 395/800.41

[58] Field of Search .................................. 395/585, 587, 395/800.23, 800.41

[56] References Cited

U.S. PATENT DOCUMENTS 5,265,213  11/1993  Weiser et al. ............................ 395/587
5,367,703  11/1994  Levitan .................................... 395/587
5,663,965  9/1997   Seymour ................................. 371/22.31

*Primary Examiner*—William M. Treat
*Attorney, Agent, or Firm*—Fliesler, Dubb, Meyer & Lovejoy LLP

[57] ABSTRACT

A microprocessor includes an instruction cache and a branch target buffer to implement a branch prediction scheme. The instruction cache, which stores branch instructions, is organized into cache lines and sets to implement set associative caching with memory that stores instructions. The branch target buffer includes storage locations organized into lines such that instructions stored in a cache line of the instruction cache correspond to a line in the branch target buffer. The storage locations permit storage of a branch target address that corresponds to any one of the sets in the cache line of the instruction cache to permit storage of branch information for multiple branch instructions when a cache line of a set stores more than one branch instruction. Thus, the resources of the branch target buffer are shared among the sets of the instruction cache.

15 Claims, 5 Drawing Sheets

FIG. 4
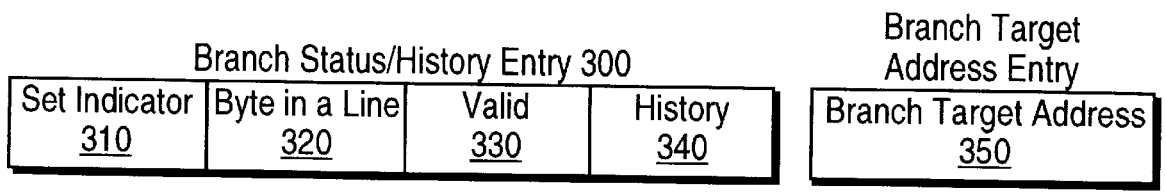
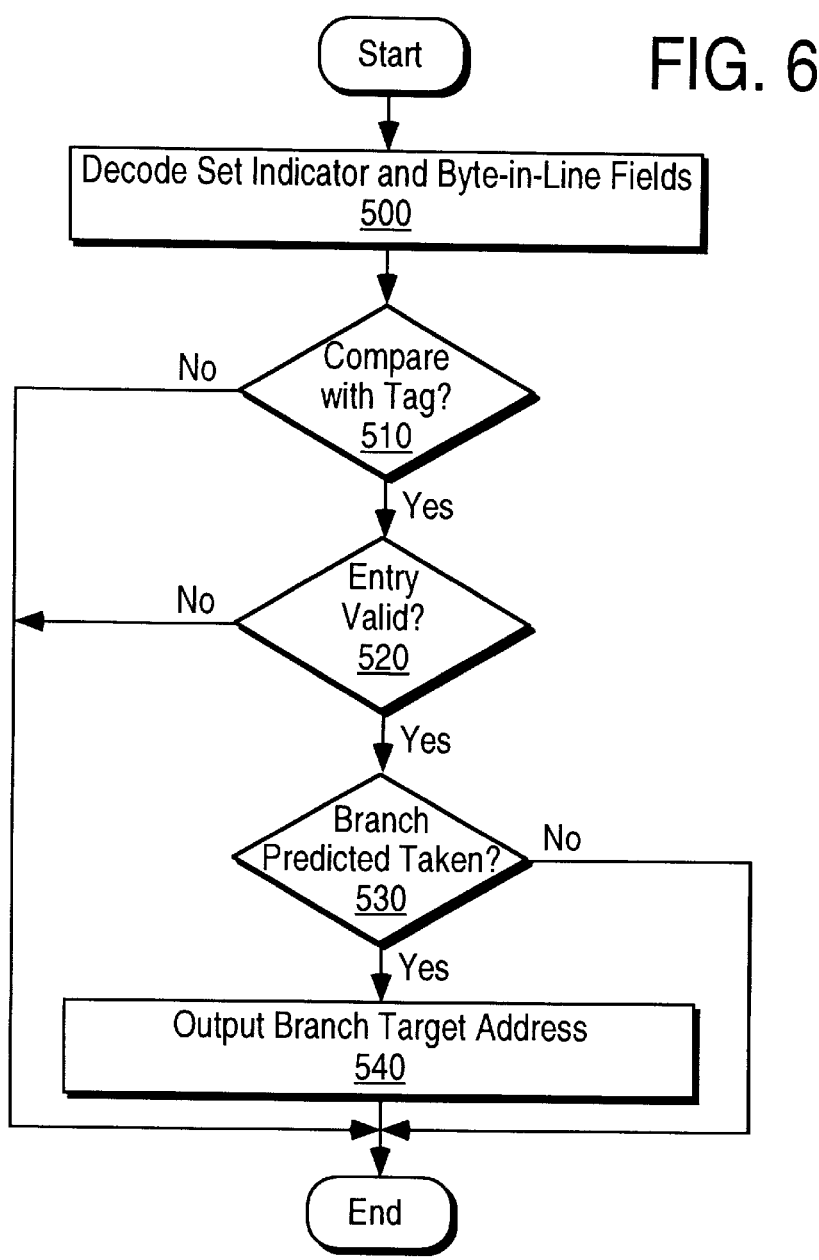
FIG. 6

CACHE LINE BRANCH PREDICTION SCHEME THAT SHARES AMONG SETS OF A SET ASSOCIATIVE CACHE

BACKGROUND OF THE INVENTION

1. Field of the Invention

The present invention is directed toward the field of microprocessors, and more particularly to a cache line based branch prediction scheme that shares locations of the branch target buffer among sets of the cache.

2. Art Background

Generally, microprocessors execute program instructions to provide specific functionality. Typically, the program instructions are stored in memory, and the microprocessor accesses the program instructions from the memory to execute them. Microprocessors have application as central processing units (CPUs) in computer systems. For a computer system, the microprocessor, or CPU, retrieves program instructions, typically stored in main memory of the computer system, to provide functionality for the computer system.

The performance of microprocessors is measured, in part, on the number of instructions the microprocessor executes in a unit of time. In order to maximize the processing flow, microprocessors attempt to provide a continuous flow of program instructions. Typically, a microprocessor function, known as instruction fetch, prefetches instructions from memory so that the microprocessor is not idle after executing one instruction but before receiving the next instruction in the program. When program instructions are prefetched, the program instructions are stored in a cache memory, typically implemented with a high-speed static random access memory (RAM). A high-speed static memory used to store program instructions is known as an instruction cache. Thus, when instructions are prefetched, the microprocessor is not delayed by a read operation to main memory.

Although prefetching instructions provides a queue of available instructions for the microprocessor, prefetching instructions from memory in the sequential order (e.g. in the address order of the instructions) does not necessarily provide instructions in the program order. Specifically, branch instructions may cause the program order to deviate from the original sequential order of the instructions. For example, a jump instruction, a form of a branch instruction, results in switching the flow of execution of instructions from one address location in the instructions to a second address location, not the next sequential instruction from the first address location. Because of these branch instructions, the prefetch operation in a microprocessor must determine the next instruction of the program order to provide a continuous flow of instructions.

Some microprocessors implement a technique known as branch prediction to predict the next instruction in the program order during the instruction fetch operation. To implement a branch prediction scheme, the microprocessor determines, for a branch instruction, whether a branch will be taken or whether the branch will not be taken. For example, a branch instruction may jump to the beginning of a loop based on a logic function. Alternatively, if the condition of the logic function is not met, then the program continues in the sequential order of the instructions.

Some microprocessors contain branch instruction buffers that store both branch instructions and a corresponding branch target address. If a branch is predicted taken, then the microprocessor fetches an address specified by the branch target address stored. Furthermore, to determine whether a branch instruction is taken, the microprocessor stores branch history information. In general, the branch history information specifies the history of whether that particular branch was taken based on the past history of the branch instruction. For example, a simple one bit branch history scheme sets a bit if the branch was taken, the last time the branch was executed, or does not set the bit if the branch was not taken the last time the branch instruction was executed. For this implementation, the microprocessor evaluates the branch history information to determine whether to fetch the next instruction identified by the branch target address. Although branch prediction increases the flow of instruction execution, the prediction and subsequent execution of instructions at the branch target address is speculative because execution of the original branch instruction may later reveal that the branch was not taken, or even if taken, the program jumped to a different target address. Thus, implementing a branch prediction scheme in a microprocessor increases the throughput of instruction execution by providing a continuous flow of instructions at the input of microprocessor execution.

As is explained fully below, the present invention provides an improved and efficient implementation of a branch prediction scheme.

SUMMARY OF THE INVENTION

A microprocessor includes an instruction cache and a branch target buffer to implement a branch prediction scheme. The instruction cache is organized into cache lines and sets for storing instructions in the instruction cache in accordance with a set associative caching scheme. The instructions stored in the instruction cache include branch instructions. The branch target buffer is organized into lines such that instructions stored in a cache line of the instruction cache correspond to a line in the branch target buffer for storage of branch information. The branch target buffer includes storage locations but the storage locations do not correspond with sets of the instruction cache. Instead, the storage locations permit storage of branch information that corresponds to any one of the sets in the cache line of the instruction cache. Accordingly, the branch target buffer shares locations among sets of the instruction cache to store branch information.

The branch target buffer consists of target address entries, which store branch target addresses, and branch history/status entries that store status and history information for a target address entry. In one embodiment, a branch history/status entry contains a set indicator field for storing a set indicator that identifies a set of the instruction cache for which the corresponding branch instruction is stored. A history field stores at least one history bit to predict whether the corresponding branch instruction will be taken or will not be taken. A valid field stores a valid bit to indicate whether the corresponding branch instruction is valid. Also, a byte in line field stores a starting address to identify the starting location of the branch instruction in the instruction cache.

BRIEF DESCRIPTION OF THE DRAWINGS

FIG. 4 illustrates the contents of an entry in a branch target buffer configured in accordance with one embodiment of the branch prediction mechanism of the present invention.

FIG. 6 is a flow diagram illustrating one embodiment of the operation of the branch target buffer logic.

DETAILED DESCRIPTION OF THE PREFERRED EMBODIMENTS

Figure 1:
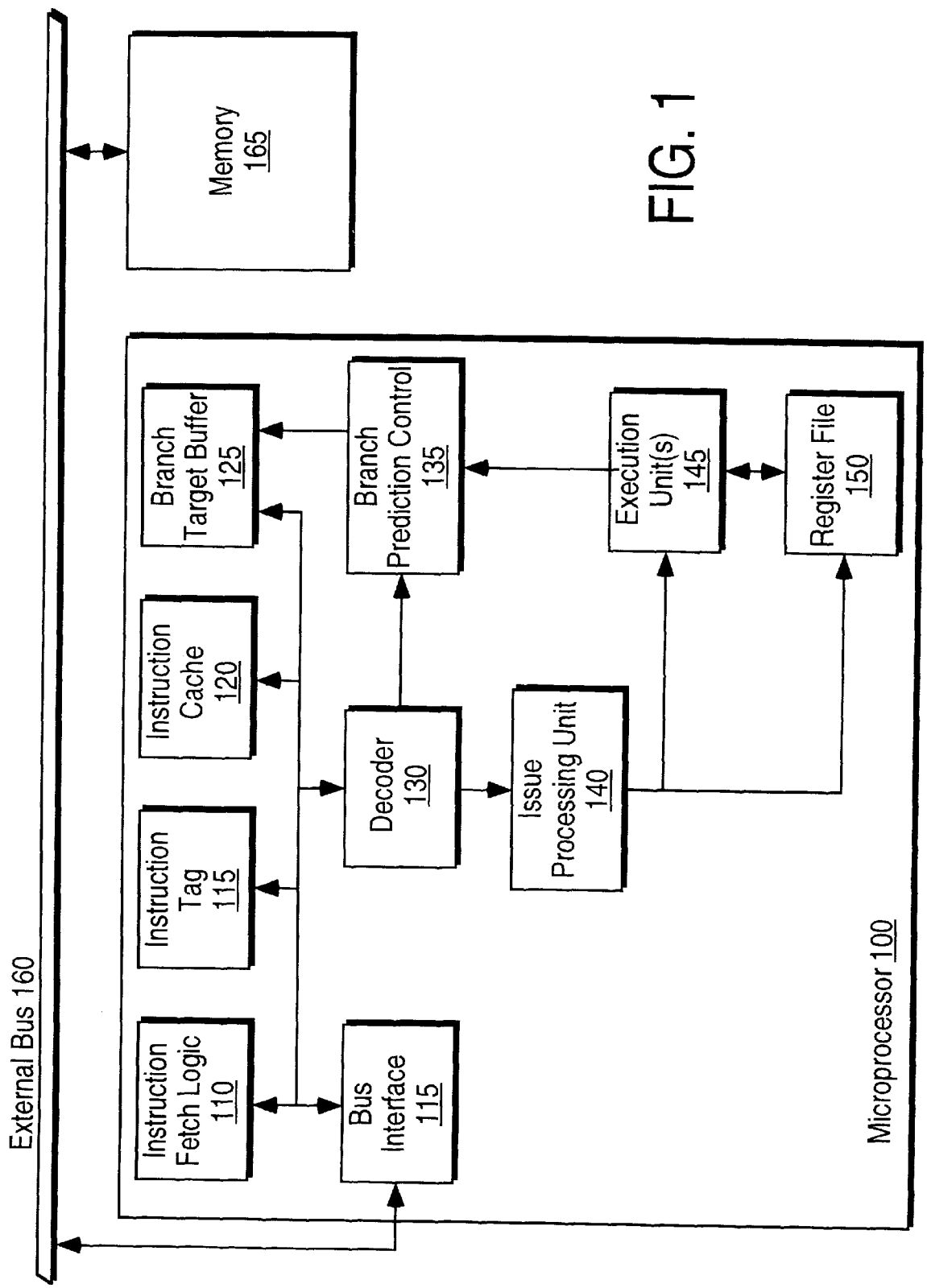
FIG. 1 is a block diagram of a microprocessor and associated memory that incorporates one embodiment of the branch prediction scheme of the present invention.

FIG. 1 is a block diagram of a microprocessor and associated memory that incorporates one embodiment of the branch prediction scheme of the present invention. For purposes of this invention, a microprocessor includes any processing unit, such as a central processing unit (CPU), a mini-computer, or a microcontroller. The microprocessor 100 contains instruction fetch logic 110. In general, the instruction fetch logic 110 retrieves instructions from an external memory, such as memory 165, to prefetch instructions for execution within the microprocessor 100. Specifically, for this embodiment, the instruction fetch logic 110 is coupled to bus interface 115, and in turn, bus interface 115 is coupled to an external bus 160. The external bus 160, which may comprise a local bus in a computer system, couples the microprocessor 100 to memory 165. The memory 165 may be main memory of a computer system that stores instructions, or may be a dedicated memory, such as a read only memory (ROM) or a programmable read only memory (PROM), that stores instructions.

To prefetch instructions from memory 165, the instruction fetch logic 110 attempts to retrieve instructions in the program order through use of a branch prediction mechanism. Due to branch instructions, the program order of instructions is not necessarily the sequential order the instructions are stored in memory 165. For this embodiment, the branch prediction mechanism includes an instruction cache 120, an instruction tag array 115, and a branch target buffer 125. In general, the instruction cache 120 stores a subset of instructions stored in the memory 165. In one embodiment, the instruction cache 120 is constructed of high-speed static random access memory (RAM). Specifically, the instruction cache 120, typically a fast access memory device, stores instructions retrieved from memory 165 by instruction fetch logic 110. Thus, the instruction cache 120 temporarily stores instructions in the instruction cache 120 for subsequent execution within the microprocessor 100.

The instruction cache 120 is organized into a plurality of cache lines and sets. As described more fully below, each cache line stores one or more instructions. In one embodiment, the instruction cache 120 is a four way set associative cache. In a four way set associative cache, portions of main memory are mapped to a specific set in the cache. For example, a first portion of memory 165 may store instructions in set 0 of instruction cache 120, and a second portion of memory 165 may store instructions in set 1 of memory 165, a third portion of memory 165 may store instructions in set 2 of memory 165, and a fourth portion of memory 165 may store instructions in set 3 of memory 165. Although the present invention is described in conjunction with a four way set associative cache scheme, any cache scheme that maps portions of a memory to specific portions or locations within a cache may be used without deviating from the spirit and scope of the invention.

In general, the instruction tag array 115 identifies a set of the instruction cache 120. Specifically, the instruction tag array 115 stores the most significant bits of an address (e.g. a tag) to identify a set for the set associative caching scheme. In a four way set associative cache, the instruction tag array 115 identifies set 0, set 1, set 2 or set 3 for a specified memory address. The instruction tag array 115 is also organized into a plurality of lines, wherein each line of the instruction tag array 115 corresponds to a cache line in the instruction cache 120. Consequently, a set of the instruction cache 120 is identified by a tag in the corresponding line of the instruction tag array 115.

For this embodiment, the branch prediction mechanism of the present invention further includes the branch target buffer 125. As is explained more fully below, the branch target buffer 125 stores branch history and status information, as well as branch target addresses for branch instructions stored in the instruction cache 120. In general, the instruction fetch logic 110 utilizes the branch status and history information to determine whether a corresponding branch instruction, stored in the instruction cache 120, is valid and is predicted taken. If the branch instruction is valid and has been predicted taken, then the instruction fetch logic 110 utilizes the branch target address, stored for the branch instruction, to fetch the instruction at that address.

As shown in FIG. 1, the microprocessor 100 includes a decoder 130. The decoder 130 receives, as input, instructions, and generates, as output, decoded instructions. In one embodiment, the microprocessor 100 is configured as a reduced instruction set computer (RISC) architecture. For this embodiment, the decoder 130 decodes the input instructions in accordance with the particular RISC instruction set. In another embodiment, the microprocessor 100 is configured to process complex instruction set computer (CISC) instructions. For example, the decoder 130 may decode instructions defined by the X-86 instruction set. The decoding of instructions for a RISC or a CISC instruction set, including the decoding of X-86 instructions, is well known in the art and will not be described further.

As shown in FIG. 1, the decoder 130 is coupled to branch prediction control logic 135. In general, the branch prediction control logic 135 maintains the contents of the branch target buffer 125 by writing branch target addresses, as well as updating branch history and status information to the branch target buffer. Initially, upon power up of the microprocessor 100, the branch target buffer 125 does not store branch target addresses or branch history and status information. After decoding instructions, the decoder 130 identifies branch instructions. The branch prediction control logic 135 predicts whether certain branch instructions are "taken" or "not taken" in the program flow based on the history of the branch instruction. Also, the branch prediction control logic 135 receives from the decoder 130 branch target addresses for branch instructions. The branch prediction control logic 135 is also coupled to execution units 145 to identify branch instructions, receive branch target addresses, as well as receive branch history and status information. The maintenance of a branch target buffer with branch target addresses and branch history information is well known in the art and will not be described further.

The block diagram of microprocessor 100 shown in FIG. 1 further includes an instruction issue unit 140, a register file 150, and execution units 145. The instruction issue unit 140 receives the decoded instructions from the decoder 130, and in turn, issues instructions to the execution units 145 as well as stores data in the register file 150. The execution units 145 include one or more functional units for processing instructions The execution units 145 may include one or more arithmetic logic units (ALUs), floating point processing units, etc. For example, the microprocessor 100 may be a superscalar microprocessor that contains more than one arithmetic logic unit. The register file 150 contains a plurality of registers that include, in part, registers that define the architectural state of the microprocessor. For example, if microprocessor 100 is configured in accordance with the X-86 architecture, then the register file 150 contains at least eight registers. The instruction issue unit 140 may include additional features, such as register renaming and issuing instructions out of their original program order. Any additional enhancements to increase the throughput of instructions in the microprocessor 100 may be implemented. The decoder 130, instruction issue unit 140, execution units 145, bus interface 115, and register file 150 are those elements typically found in a microprocessor. In fact, these components are intended to represent a broad category of such circuits and microcode used in microprocessors, and may be substituted without deviating from the spirit and scope of the invention.

The branch prediction mechanism of the present invention utilizes a form of cache line based branch prediction. In prior art cache line based branch prediction schemes, each entry in the branch target buffer (BTB) and the branch history buffer (BHB) corresponds to an instruction in the instruction cache. As explained fully below, in the cache line based branch prediction scheme of the present invention, each entry in the branch target buffer 125 corresponds to an entire cache line. Generally, cache line based branch prediction includes integrating a branch instruction buffer, which stores branch instructions only, into an instruction cache (e.g. the instruction cache 120 for the embodiment shown in FIG. 1). Thus, branch instructions are stored with other instructions in the instruction cache 120, thereby eliminating a separate branch instruction buffer from the microprocessor.

Figure 2:
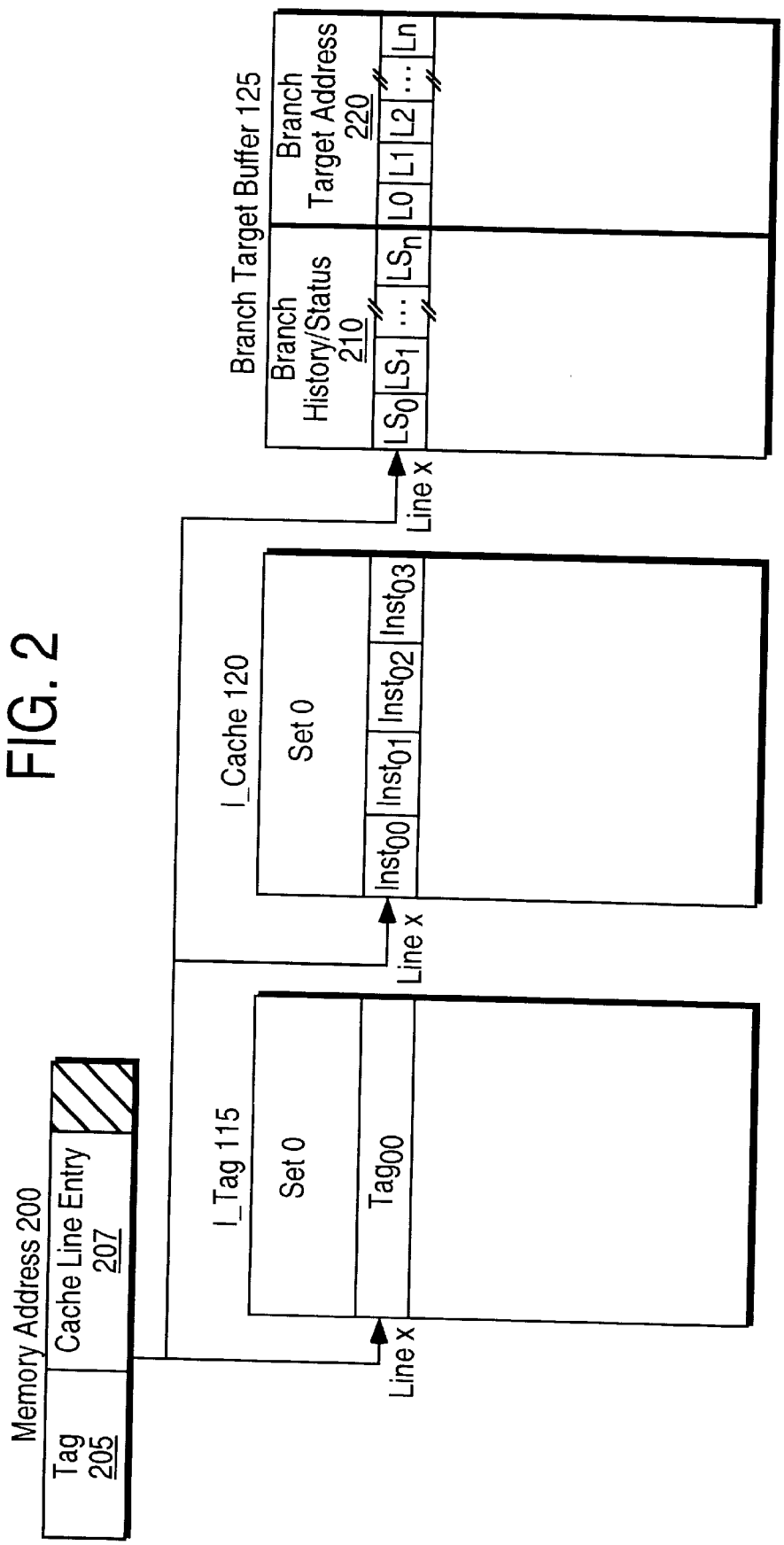
FIG. 2 is a block diagram illustrating a form of cache line based branch prediction.

FIG. 2 is a block diagram illustrating a form of cache line based branch prediction. The block diagram of FIG. 2 includes, from the embodiment of a microprocessor shown in FIG. 1, the instruction tag array 115, the instruction cache 120, and the branch target buffer 125. As discussed above, to implement a set associative cache, the instruction cache 120 is divided into sets (e.g. four sets for a four way associative cache). For purposes of explanation and simplification, the instruction cache 120 and instruction tag array 115 shown in FIG. 2 include only set 0. For a four way set associative cache, set 0 is replicated four times to include set 0, set 1, set 2, and set 3, for both the instruction cache 120 and the instruction tag array 115.

The instruction tag array 115 and branch target buffer 125 are configured to include a plurality of lines that correspond to the cache lines of the instruction cache 120. Each line of the instruction cache 120 stores one or more instructions. In one embodiment, the instruction cache 120 stores 16 bytes per cache line. For example, if each instruction in a RISC instruction set is four bytes in length, then each cache line stores four instructions. For an X-86 instruction set implementation, instruction lengths vary between 1 and 15 bytes. Thus, for an X-86 instruction set implementation, a single cache line may store up to 16 instructions (e.g., sixteen 1 byte instructions)

For purposes of explanation, entries for a line$_x$ in the instruction tag array 115, instruction cache 120 and branch target buffer 125 are shown in FIG. 2. The cache line$_x$ in the instruction cache 120 includes four instructions: inst00, inst01, inst02, and inst03. For all instructions stored in cache line$_x$ of set 0 (e.g. inst00, inst01, inst02, and inst03) of the instruction cache 120, tag$_{00}$ of the instruction tag array 115 identifies set 0. A tag consists of the most significant bits of a memory address required to uniquely identify a cache line in a cache for either a direct mapped or set associative mapped caching scheme. For this example, tag$_{00}$ in the cache line$_x$) of the instruction tag array 115 identifies that inst$_{00}$, inst$_{01}$, inst$_{02}$ and inst$_{03}$ are located in set0 of the instruction cache 120.

As shown in FIG. 2, the branch target buffer 125 includes branch history entries 210 and target address entries 220 corresponding to all sets of the instruction cache. The branch history entries 210 store branch history and status information for each branch instruction that stores a branch target address in a target address entry. The branch history entries 210 include, for each cache line, "n" locations, labeled $LS_0$, $LS_1$, $LS_2$, ... $LS_n$. Similarly, each target address entry includes 220 includes "n" locations, labeled $L_0$, $L_1$, $L_2$, ... $L_n$. For a four way set associative cache implementation, branch history entries 210 and the target address buffer 220 may include four locations each (e.g. n=4), one for each set of the instruction cache. Each branch history entry 210 corresponds with a target address 220. For example, branch history entry, $LS_0$, stores branch history and status information that corresponds to the branch target address stored in location $L_0$ of the target address buffer 220. Thus, the branch target buffer 125 is populated with branch target addresses and corresponding branch history and status information for branch instructions stored in the instruction cache 120.

Typically, in a strict cache line based branch prediction scheme, the branch target buffer is configured into sets that correspond to sets of the instruction cache. Thus, each entry in the branch target buffer corresponds to a set in the instruction cache. For example, in a strict cache line based branch prediction scheme, one branch instruction from set 0 of an instruction cache may be stored in the entry of the branch target buffer designated for set 0. In the strict cache line based branch prediction scheme, if there are multiple branch instructions in a cache line of a set, then information for only one of the branch instructions may be stored in the branch target buffer. Moreover, other sets in the instruction cache may not contain any branch instructions rendering the corresponding entries in the branch target buffer unused. Thus, implementation of a strict cache line based branch prediction scheme results in under utilization of branch target buffer resources. The branch prediction mechanism of the present invention does not map or allocate sets of the instruction cache to specific entries in the branch target buffer. Instead, any branch instruction from any set of a line of the instruction cache 120 may store branch history status and a branch target address in any location of that line of the branch target buffer 125.

Figure 3:
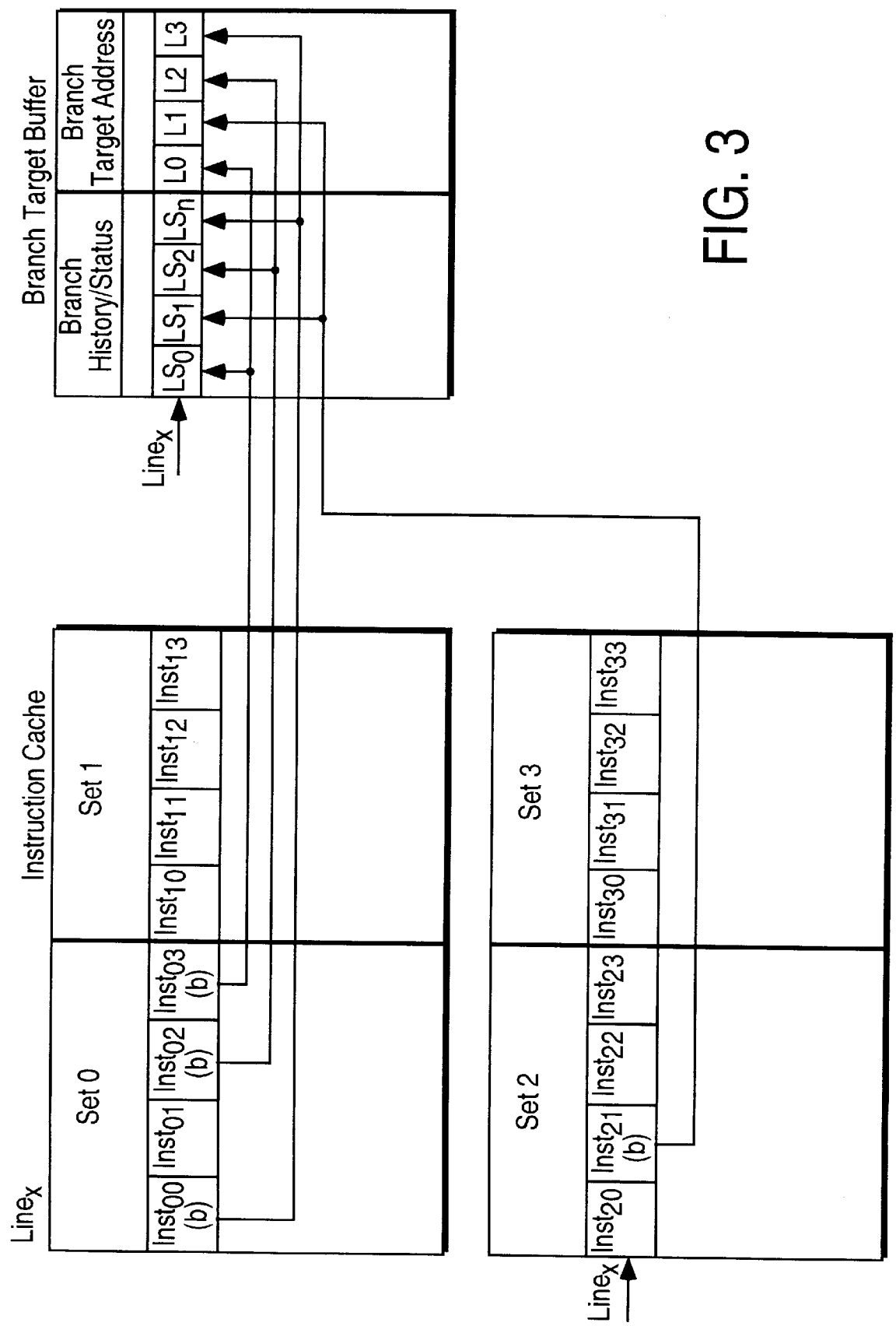
FIG. 3 is a block diagram illustrating an example mapping of branch instructions in an instruction cache to locations in a branch target buffer.

FIG. 3 is a block diagram illustrating an example mapping of branch instructions in an instruction cache to locations in a branch target buffer. For this examples an instruction cache 210 is shown as having four sets (e.g. set 0, set 1, set 2, and set 3). A branch instruction of FIG. 3 is marked with the symbol "(b)" to denote that the instruction is a branch instruction For this example, set 0 of instruction cache 210 includes three branch instructions: (b)inst00, (b)inst02, and (b)inst03 (i.e. inst01 is not a branch instruction). As shown in FIG. 3, set 1 of instruction cache 210 also contains four instructions: inst$_{10}$, inst$_{11}$, inst$_{12}$, and inst$_{13}$. However, none of the instructions in set 1 are marked as branch instructions. Accordingly, set 1 does not have any requirements to store branch information in the branch target buffer 205. Set 2 of the instruction cache 210, which includes instructions inst$_{20}$, (b)inst$_{21}$, inst$_{22}$, and inst$_{23}$, stores a single branch instruction, (b)inst$_2$. Set 3 of instruction cache 210, which includes inst$_{30}$, inst$_{31}$, inst$_{32}$, and inst$_{33}$, does not store any branch instructions. For this example, the branch target buffer 205 is configured to include four location pairs, one for each set of the instruction cache 210. For this example, branch status/history and target addresses for branch instructions (b)inst00, (b)inst02, and (b)inst03, stored in set 0 of instruction cache 210, are stored in locations LS0/L0, LS2/L2, and LS3/L3, respectively, in the branch target buffer 205. For the remaining branch instruction of cache line$_x$ stored in set 2 of the instruction cache 210, branch history/status information and a branch target address are stored in the second location of the branch target buffer 205 (e.g. LS$_1$/L$_1$). Accordingly, for this example, all locations in cache line$_x$ of the branch target buffer 205 are used for branch instructions, regardless of the set for which the branch instruction originated in the instruction cache In one embodiment of the branch prediction scheme, a line of the instruction cache, instruction tag array, and the branch target buffer is simultaneously accessed with the same address. Referring again to FIG. 2, a memory address 200 is used to access the instruction tag array 115, instruction cache 120, and branch target buffer 125. The memory address 200 includes a tag 205 and a cache line entry 207. To retrieve an instruction from the instruction cache 120, the cache line entry 207 of the memory address 200 is used to access a line in the instruction tag array 115, instruction cache 120 and branch target buffer 125. The least significant bits of the memory address 200 are used to access an individual instruction within a cache line of instruction cache 120. The tag 205 of the memory address 200 is compared against tags stored in the cache line of each set. Based on the comparison, a set, corresponding to the tag compared, is identified. For example, if the tag 205 of a memory address 200 was equal to tag$_{00}$, then set0 is selected. In a strict cache line based branch prediction scheme, the circuitry is simplified. The comparison of tags is used, in addition to selecting a set of the instruction cache, for selecting an entry in the branch target buffer 125. However, the branch prediction mechanism of the present invention includes additional logic to select a location within the branch target buffer to identify the appropriate branch history/status and branch target address.

FIG. 4 illustrates the contents of an entry in the branch target buffer 125 configured in accordance with one embodiment of the branch prediction mechanism of the present invention. For this embodiment, a branch history status entry 300 includes a set indicator field 310, a byte in a line field 320, a valid bit 330, and a history field 340. As shown in FIG. 4, an entry in the branch target buffer 125 also includes a branch target address field 350. The branch target address field 350 stores the branch target address that corresponds to the branch history/status information for that entry. The set indicator field 310 indicates the set in the instruction cache 120 that stores the branch instruction for which the branch target address 350 corresponds. For example, if the branch history status entry 300, and corresponding branch target address entry 350, stores information for a branch instruction located in set "0" of the instruction cache 120, then the set indicator field 310 stores "00." For a four way set associative cache implementation, the set indicator field 310 consists of two bits to identify four values (i.e. one value for each set). The byte in a line field 320 identifies the starting byte for an instruction in the instruction cache 120. For example, if the cache line stored four instructions, each four bytes in length, in a sixteen byte cache line, and the branch target buffer stored branch information for the second instruction of the cache line, then the byte in a line field 320 stores a value to identify the starting byte for the second instruction of the cache line (e.g. fifth byte of the cache line).

The valid field 320 stores, in one embodiment, a one bit value to indicate whether the entry in the branch target buffer is valid. As is well known in the art of cache memory, when a cache miss occurs, the controlling cache management policy may replace an old entry of the cache with a new entry. For this example, if the old entry was a branch instruction that included a corresponding entry in the branch target buffer, then the valid field 330 is set to indicate that the branch target buffer entry is no longer valid.

The branch history buffer 300 further includes a branch history field 340. In one embodiment, the history field 340 stores a single bit of branch history information. For this embodiment, the history field 340 indicates whether the branch, corresponding to the branch instruction, was taken the last time the branch instruction was executed, or was not taken the last time the branch instruction was executed. As discussed above, if the branch was taken, then the instruction fetch logic 110 (FIG. 1) uses the branch target address, stored in the branch target address field 350, to fetch an instruction as the next instruction in the program flow. Alternatively, the history field 340 may store more than a single bit of history information. For example, the history field 340 may store two bits of history information to reflect the history of branch execution (e.g. taken or not taken) during the last two times. In addition, any scheme may be used to set one or more history bits in the history field 340. For example, a statistical algorithm may be implemented to reflect the probability that the branch will be taken or will not be taken. Any branch history scheme may be used without deviating from the spirit or scope of the invention.

As discussed above, the branch prediction mechanism of the present invention provides a more efficient use of processor resources. For example, there is often multiple branch instructions situated next to each other in a program. One utility of the branch prediction mechanism of the present invention is that most or all of the branch instructions stored in the same cache line may have corresponding entries in the branch target buffer. When more than one branch instruction is stored in the same cache line of the same set in an implementation that uses a strict cache line based branch prediction scheme, only one of the branch instructions may include branch target information in the branch target buffer. Thus, as multiple branch instructions are encountered in a single cache line of a set, branch instruction information is swapped from an old branch instruction of the cache line to a new branch instruction in the same cache line. This is similar to cache thrashing, and may occur in a branch target buffer that implements a strict cache line based branch prediction scheme. The thrashing results in a high rate of misses in the branch target buffer. The branch prediction scheme of the present invention reduces thrashing by permitting storage of branch information for multiple branch instructions located in a single cache line of a set.

The general operation for a fetch cycle in a microprocessor implementing the branch prediction mechanism of the present invention will now be described. As discussed above, the instruction fetch logic 110 (FIG. 1) prefetches instructions from main memory 165 for temporary storage in the instruction cache 120. One or more instructions are then input into the decoder 130. The microprocessor 100 determines whether an instruction is stored in the instruction cache 120. To accomplish this, the microprocessor 100 utilizes the memory address 200 (FIG. 2), including the cache line entry 207 and the tag 205 portions. The cache line entry 207 is used to access a cache line in the instruction tag array 115, instruction cache 120 and branch target buffer 125. The tag 205 of the memory address 200 is compared with tags stored in sets of the instruction tag array 115 in that cache line. If a match occurs, then the desired instruction is stored in the corresponding set of the instruction cache 120. With the cache line (e.g., indexing and offset) and set information, the instruction is read from the instruction cache 120. If the instruction is not a branch instruction, then the instruction is loaded into the decoder 130, and the instruction fetch logic 110 fetches the next sequential instruction in the original program order. If the instruction in the instruction cache 120 is a branch instruction, then the instruction fetch logic 110 accesses the branch target buffer 125 to determine whether a branch target address is stored for the corresponding branch instruction. If branch information is stored for the branch instruction, the validity of the branch target buffer entry is checked.

The instruction fetch logic 110 determines whether the branch is taken or not taken through examination of the history field. If the entry is valid and the branch is predicted taken, then the instruction fetch logic 110 retrieves the corresponding branch target address, and utilizes the branch target address to fetch the instruction located at the specified address. If the branch instruction has been mispredicted (e.g. the branch was either not taken or the branch instruction shifted program execution to a different instruction), then the proper address is fetched by the instruction fetch logic 110 when the location of the next instruction is determined. Typically, in a pipelined microprocessor, the misprediction of a branch instruction results in a penalty performance because the pipeline of instruction flow is flushed while the correct instruction is retrieved and subsequently loaded into the beginning of the pipeline.

Figure 5:
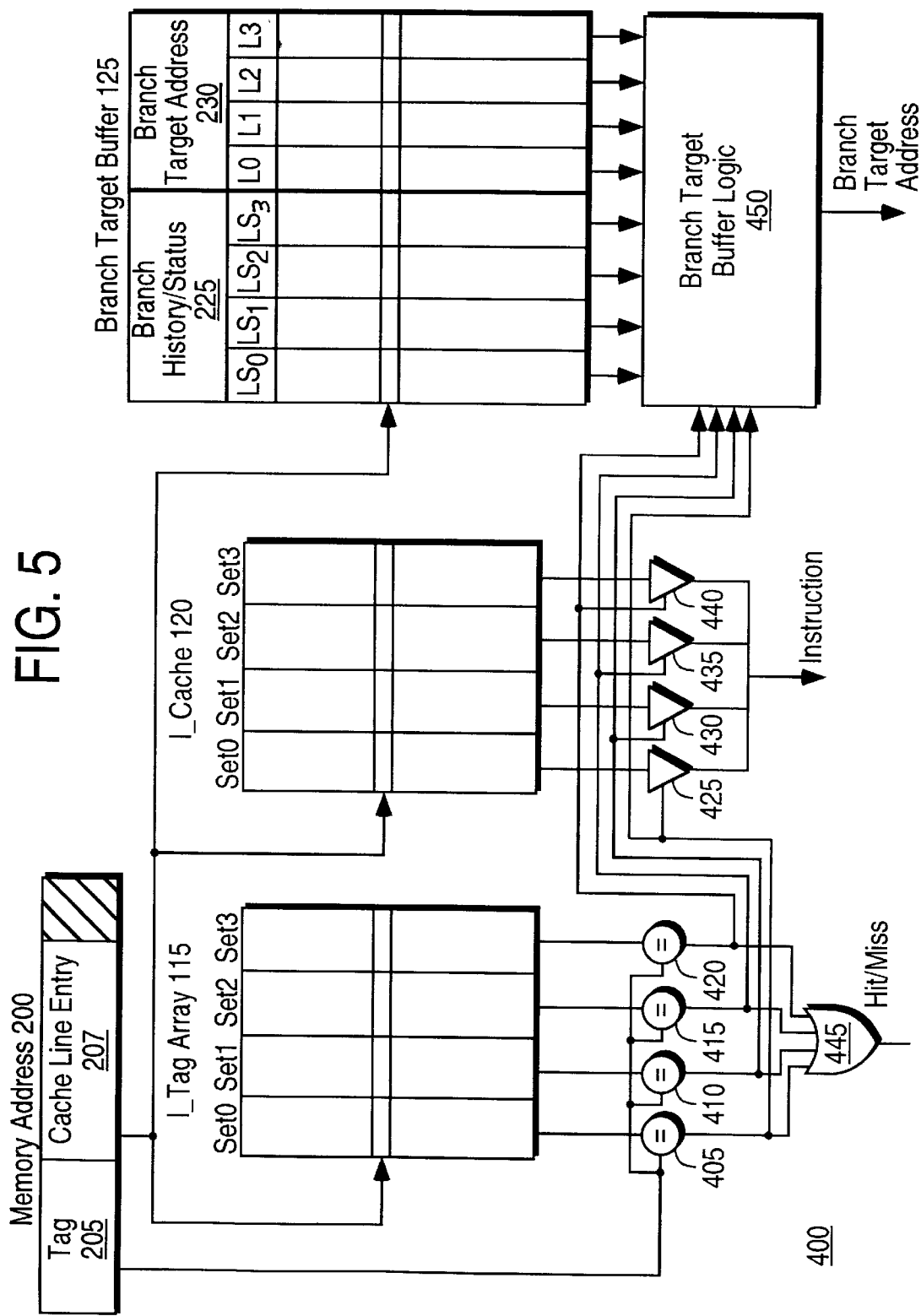
FIG. 5 is a circuit diagram illustrating one embodiment for implementing a branch prediction scheme in accordance with the present invention.

FIG. 5 is a circuit diagram illustrating one embodiment for implementing a branch prediction scheme in accordance with the present invention. Although the cache line based branch prediction circuit 400 is shown as having four sets, any number of sets may be used without deviating from the spirit and scope of the invention. A cache line based branch prediction circuit 400 includes the instruction tag array 115, instruction cache 120, and branch target buffer 125. The instruction tag array 115 is coupled to a plurality of comparators, labeled 405, 410, 415 and 420 on FIG. 5. Specifically, the output of each set of the instruction tag array 115 is coupled to a first input on each comparator (405, 410, 415, and 420). The second input of each comparator (405, 410, 415, and 420) receives the tag 205 of the memory address 200. The output of each comparator (405, 410, 415, and 420) is input to an OR gate 445.

As shown in FIG. 5, the output of set 0, set 1, set 2, and set 3 of the instruction cache 120 is input to a multiplexer comprising buffers 425, 430, 435, and 440, respectively. The buffers 425, 430, 435, and 440 are enabled by the output of the comparators 405, 410, 415, and 420 such that instructions from the instruction cache 120 are output based on the comparison between the tag 205 and the tag stored for a corresponding set. The branch target buffer 125 is coupled to branch target buffer logic 450. The operational flow of the branch target buffer logic 450 is described below in conjunction with a description of FIG. 6.

As discussed above, to determine whether an instruction is located in the instruction cache 120, the cache line entry 207 of memory address 200 is used to simultaneously access a line in the instruction tag array 115, instruction cache 120, and branch target buffer 125 as shown by the lines and arrows on FIG. 5. The access operation is performed in accordance with a standard read operation to a memory, typically a static random access memory (RAM). Using the cache line entry 207 of memory address 200 as a row address, tags from set 0, set 1 set 2, and set 3 are input to the comparators 405, 410, 415, and 420, respectively. The tag portion 205, the second input to comparators 405, 410, 415, and 420, is compared to each tag of each set via the comparators. The output of each comparator, indicating a comparison between a tag in the corresponding set and the tag portion 205, is input to the OR gate 445. The OR gate 445 outputs a high logic level if one input to the OR gate 445 indicates a match. Thus, the output of OR gate 445 indicates a cache hit or a cache miss. If a cache hit occurs, then the output of the comparator with a tag match generates a signal at a high logic level. This high logic level signal enables one of the buffers (e.g. 425, 430, 435, or 440). Thus, the instruction located in the cache line and in the set having a comparison with the instruction tag array is output as "instruction" as shown in FIG. 5.

The four branch history status entries 225 ($LS_0$, $LS_1$, $LS_2$, and $LS_3$) at the cache line are input to the branch target buffer logic 450. As described below, the branch target buffer logic 450 determines: if a branch target address is stored for a branch instruction; whether the branch target entry is valid; and which location the branch target address is stored (e.g. $L_0$, $L_1$, $L_2$, or $L_3$). The branch target buffer logic 450 then accesses the target address buffer 230 to retrieve the branch target address for a corresponding branch instruction.

FIG. 6 is a flow diagram illustrating one embodiment of the operation of the branch target buffer logic 450. As discussed above, for an instruction cache access, each entry of the branch history buffer 225 for a corresponding cache line is input to the branch target buffer logic 450. As discussed above, branch target information for any branch instruction may be stored in any location (e.g. $LS_0$, $LS_1$, $LS_2$, and $L_3$). To determine whether branch information is stored in the branch target buffer 125 for a branch instruction, the branch target buffer logic 450 decodes the set indicator and byte in line fields as shown in block 500 of FIG. 6. The set indicator field and byte in a line field indicates, for each branch history status entry (e.g. $LS_0$, $LS_1$, $LS_2$, and $LS_3$), the corresponding branch instruction in the instruction cache 120.

The output of the comparators (405, 410, 415, and 420) are input to the branch target buffer logic 450 as shown in FIG. 5. The branch target buffer logic 450 uses the output of the comparators to determine which set and byte within a set the branch instruction is located. This comparison is shown as the compare with tag block 510 in FIG. 6. If the output signals from the comparators (405, 410, 415, and 420) do not compare with the decoded set indicator and byte in line fields, then there is not a corresponding branch target address stored in the branch target buffer for the branch instruction. If a comparison is made, then the branch target buffer logic 450 evaluates the valid field of the selected branch history status entry (e.g. $LS_0$, $LS_1$, $LS_2$, or $LS_3$) to determine whether the branch target entry is valid as shown in block 520. If the entry is not valid, then no target address is accessed from the branch target buffer. If the entry is valid, then the branch target buffer logic 450 evaluates the branch history field to determine whether the branch is predicted taken or predicted not taken as shown in block 530 of FIG. 6. If the branch is predicted not taken, then no branch target address is retrieved. Alternatively, if the branch is predicted taken, then the branch target buffer logic accesses the target address buffer 230 at the location specified by the selected location. For example, if the output of the comparators (405, 410, 415, and 420) compared with location 0 in the branch history buffer 225 (e.g. $LS_0$), then the branch target buffer logic 450 accesses location $L_0$ to retrieve the branch target address as shown in block 540 of FIG. 6.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A microprocessor comprising:

an instruction cache, organized into a plurality of cache lines and a plurality of sets, for storing a plurality of instructions in said instruction cache in accordance with a set associative caching scheme, wherein one or more of said instructions comprise branch instructions; and a branch target buffer, organized into a plurality of lines such that instructions stored in a cache line of said instruction cache correspond to a line in said branch target buffer, said branch target buffer comprising a plurality of storage locations to permit storage of branch information that corresponds to any one of said sets in said cache line of said instruction cache, whereby said branch target buffer permits storage of branch information when a cache line of a set stores more than one branch instruction.

2. The microprocessor as set forth in claim 1, wherein said set associative caching scheme comprises a four way set associative caching scheme.

3. The microprocessor as set forth in claim 1, wherein said branch target buffer comprises branch target entries for storing branch target addresses and branch status/history entries for storing branch status/history information for an entry of said target address buffer.

4. The microprocessor as set forth in claim 3, wherein said branch status/history entries comprise a set indicator field for storing a set indicator, wherein said set indicator identifies a set of said instruction cache for a corresponding entry in said branch target address buffer.

5. The microprocessor as set forth in claim 3, wherein said branch status/history entries comprise a history field for storing at least one history bit that predicts whether a corresponding branch instruction will be taken or will not be taken.

6. The microprocessor as set forth in claim 3, wherein said branch status/history entries comprise a valid field for storing a valid bit that indicates whether a corresponding branch instruction is valid.

7. The microprocessor as set forth in claim 3, wherein said branch status/history entries comprise a byte in line field for storing a value that indicates a starting address in a corresponding cache line to identify said branch instruction.

8. A method for implementing branch prediction in a microprocessor comprising the steps of:

configuring an instruction cache to include a plurality of cache lines and a plurality of sets;

configuring a branch target buffer, comprising a plurality of storage locations, into a plurality of lines such that instructions stored in a cache line of said instruction cache correspond to a line in said branch target buffer;

storing a plurality of instructions in said instruction cache in accordance with a set associative caching scheme, wherein one or more of said instructions comprise branch instructions; and storing in said branch target buffer branch information that corresponds to any one of said sets in said cache line of said instruction cache, whereby said branch target buffer permits storage of branch information when a cache line of a set stores more than one branch instruction.

9. The method as set forth in claim 8, wherein the step of configuring an instruction cache comprises the step of configuring said instruction cache as a four way set associative cache.

10. The method as set forth in claim 8, wherein:

the step of configuring a branch target buffer comprises the step of configuring said branch target buffer into branch target address entries and branch status/history entries; and the step of storing a branch information in said branch target buffer comprises the step of storing a branch target address in a branch target entry and storing branch status/history in a status/history entry.

11. The method as set forth in claim 8, wherein the step of storing branch information in said branch target buffer comprises the step of storing a set indicator to identify a set of said instruction cache for a corresponding entry in said branch target buffer.

12. The method as set forth in claim 8, wherein the step of storing branch information in said branch target buffer comprises the step of storing at least one history bit that predicts whether a corresponding branch instruction will be taken or will not be taken.

13. The method as set forth in claim 8, wherein the step of storing branch information in said branch target buffer comprises the step of storing a valid bit that indicates whether a corresponding branch instruction is valid.

14. The method as set forth in claim 8, wherein the step of storing branch information in said branch target buffer comprises the step of storing a byte in a line value that indicates a starting address in a corresponding cache line to identify said branch instruction.

15. A microprocessor comprising:

an instruction cache, organized into a plurality of cache lines and a plurality of sets, for storing a plurality of instructions in said instruction cache in accordance with a set associative caching scheme, wherein one or more of said instructions comprise branch instructions; and a branch target buffer, organized into a plurality of lines such that instructions stored in a cache line of said instruction cache correspond to a line in said branch target buffer, said branch target buffer comprising branch target address entries for storing branch target addresses and branch status/history entries for storing branch status/history information for an entry of said target address buffer, such that said branch target buffer permits storage of branch information that corresponds to any one of said sets in said cache line of said instruction cache, whereby said branch target buffer permits storage of branch information when a cache line of a set stores more than one branch instruction.

\* \* \* \* \*